No. 32,582. PATENTED JUNE 18, 1861.
W. P. PENN.
THRESHING MACHINE.

Witnesses,

Inventor,

UNITED STATES PATENT OFFICE.

WORDEN P. PENN, OF BELLEVILLE, ILLINOIS.

THRESHING-MACHINE.

Specification forming part of Letters Patent No. 32,582, dated June 18, 1861; Reissued February 8, 1876, No. 6,910.

*To all whom it may concern:*

Be it known that I, WORDEN P. PENN, of Belleville, in the county of St. Clair and State of Illinois, have invented certain new and useful Improvements in Threshing-Machines; and I do hereby declare that the following is a full, clear, and exact description of the construction and operation of the same, reference being had to the annexed drawing, making a part of this specification, and to the letters of reference marked thereon.

Figure 1:
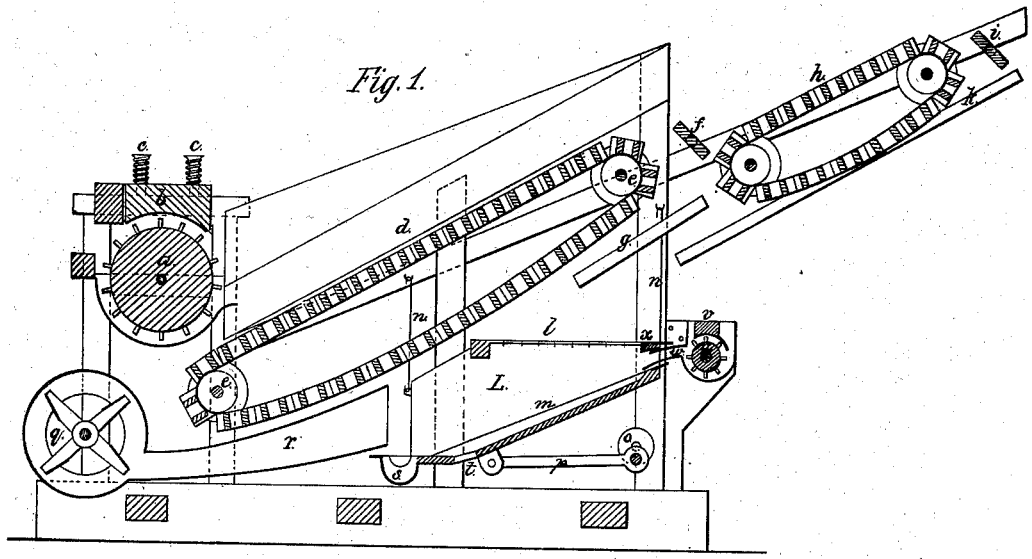
Figure 2:
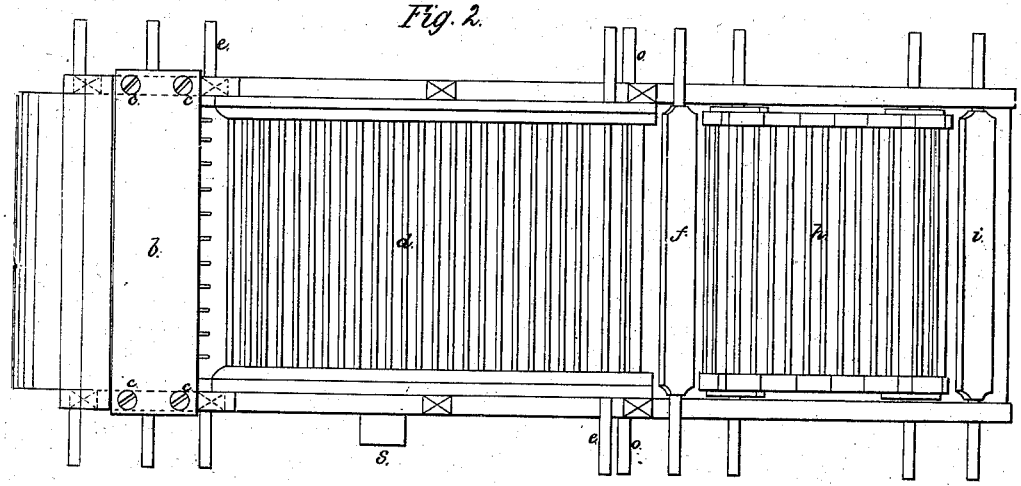

Figure 1, is a sectional elevation of my improved threshing machine, showing the arrangement and combination of its various parts. Fig. 2 is a plan of the same.

$a$ is a threshing cylinder fitted with teeth, and of the ordinary construction; and $b$ is the "concave" to the same. This concave is not screwed fast to the frame, but is pressed down upon it above the threshing cylinder by the springs $c$ $c$ on bolts which pass through the ends of the concave and are screwed to the frame of the machine.

$d$ is a separator belt working around the pulleys on the shafts $e$, $e$. This separator belt is a close, canvas belt extending across the machine, with its edges working under projecting pieces of the frame which prevent the falling of the grain over the sides. The bars of the separator are made in pairs, and secured to the belt in such a manner that they pass readily around the pulleys upon which it works.

$f$ is a beater.

$g$ is an inclined plane or "reflector", which I prefer to make of tin plate or other metal.

$h$ is a second separator belt constructed in a manner similar to the belt before described.

$i$ is a second beater. $k$ is also a metal deflector.

L is a shoe containing the riddles or sieves $l$ and $m$, and hanging by the suspenders $n$ $n$. The shoe is shaken to and fro by the rotation of the crank shaft $o$, operating through the pitman $p$. The motion thus given to the shoe is in a direction lengthwise the frame, and consequently exercises none of the transverse racking that is inseparable from the ordinary bell-crank and is so destructive to the machine.

$q$ is a fan placed for convenience of construction and operation, in front of the separator belt $d$, and under, and slightly forward of the cylinder $a$.

$r$ is the nozzle of the fan leading under the separator belt $d$ to the riddle shoe L.

$s$ is the grain spout or leader from the shoe.

$t$ is an opening for the delivery of the "cheat" from the shoe.

$u$ and $v$ are a threshing cylinder and concave constituting a second thresher. This secondary, or tailing thresher, is fitted with plates forming a spout $w$ by which the threshed grain is delivered upon the riddle $m$. The various motions of the machine are obtained and transferred by the ordinary gearing and belts.

The operation of my improved machine is as follows—The grain is fed into the machine between the cylinder $a$ and the concave $b$, and is threshed by their combined action; and if too much should be thrust into the machine the concave will be permitted to yield by the compression of the springs $c$, and thus avert the danger of breakage. It is then carried by the separator belt $d$ over the beater $f$ to the second separator belt $h$. The loose grain separated by the belt $d$ and the beater $f$ falls upon the inclined plane or reflector $g$, and is delivered upon the riddle or screen $l$. The straw is carried by the second separator to the second beater, and thence leaves the machine. The grain separated by this additional treatment falls upon the deflector $k$ and is delivered to the riddle $l$, that sifts the grain upon the riddle $m$, by which it is screened from the "cheat" and dust, and delivered into the spout $s$ that carries it out of the machine. The cheat falls through the opening $t$ in the bottom of the shoe. The shoe L, and its riddles $l$ and $m$, are operated by the crank shaft $o$, and are subjected to the winnowing influence of the blast from the fan $q$, conducted by the nozzle $r$, and directed over the apron $x$ toward the rear of the machine. The heads of grain that cannot pass through the upper screen $l$ are thus transferred by the combined action of the blast, and the longitudinal motion of the shoe, to the tailings thresher.

Having thus described the construction and operation of my improved threshing machine, I will proceed to state that I claim as my invention and desire to secure by Letters Patent—

1. The arrangement of the concave $b$ over the cylinder $a$, in combination with two close separator belts and two beaters, as and for the purpose described.

2. The two metallic deflectors, in combination with the two separator belts, the riddle shoe and the tailings thresher, arranged in the manner described, for the purpose of depositing the grain upon the riddle in the shoe so that the unthreshed heads will chiefly fall in the rear of the threshed grain upon the apron on the back part of the riddle.

3. The combination of a transverse crank shaft and blower, with the riddle shoe constructed as described, by which the heads may be transmitted from the upper sieve to the tailings thresher.

4. The construction of the riddle shoe as described, with an apron on the rear end in combination with the spout of the tailings thresher, occasioning the delivery of the unthreshed heads to the tailings thresher.

5. The small cylinder $u$ and concave $v$ constituting a tailings thresher, arranged as shown, with a spout $w$ passing under the apron of the riddle shoe, and delivering the threshed grain upon the lower sieve.

6. The arrangement of the fan and the nozzle of the fan chest, the riddle shoe and tailings thresher, in the manner described and for the purpose specified.

7. The combination of two threshers and two separator belts and beaters arranged as described, with the concave $b$ and springs $c$, in the manner and for the purpose specified.

W. P. PENN.

Witnesses:
F. D. BELCOUR,
A. J. FARIS.